UNITED STATES PATENT OFFICE.

FRANK L. KRYDER, OF AKRON, OHIO.

PROCESS OF RECLAIMING AND REGENERATING RUBBER-WASTE.

1,340,777. Specification of Letters Patent. Patented May 18, 1920.

No Drawing. Application filed August 18, 1919. Serial No. 318,321.

*To all whom it may concern:*

Be it known that I, FRANK L. KRYDER, a citizen of the United States, residing at Akron, in the county of Summit and State of Ohio, have invented certain new and useful Improvements in Processes of Reclaiming and Regenerating Rubber-Waste, of which the following is a specification.

My invention relates to an improved process of reclaiming and regenerating rubber waste, and has for its object to provide a method whereby rubber waste may be restored practically to its original condition and usefulness.

Rubber waste ordinarily consists of vulcanized rubber derived from various sources. Such waste is of little use until the fabric which is ordinarily present therein, is eliminated, the rubber devulcanized and the resulting product softened or rendered easily workable.

Various processes have heretofore been employed with more or less success for accomplishing these results, but such processes have been open to the objection that their use does not restore the rubber substantially to its original condition.

In the application of my process to reclaiming and regenerating rubber waste containing textile fiber or fabric, I first disintegrate such rubber waste by grinding. The disintegrated waste is then placed in a steam jacketed container adapted to be hermetically sealed and therein subjected to the action of a heated liquid bath containing preferably from 10 to 15 per cent. by weight of caustic soda in aqueous solution. Steam is admitted to the container and the mixture agitated therein preferably from 6 to 20 hours at a pressure of preferably from 50 to 200 pounds per square inch. The temperature employed and duration of treatment will depend in a very large measure upon the amount of fabric or fiber in the rubber waste.

The treated rubber mass is then removed from the container and subjected to a drying operation, preferably in a centrifugal drier, to remove caustic soda solution therefrom.

The rubber mass is then returned to the jacketed container and subjected to the action of a preferably heated solution comprising phenylenediamin and paraffin oil, to which may be advantageously added an acid, preferably an organic acid, such as acetic acid and mineral rubber or rubber resin or both. Where the treated rubber contains any material amount of caustic soda, the use of the acid is of particular value and importance and a sufficient amount of the acid should be used to fully neutralize the alkali present.

In the use of the solution comprising phenylenediamin and paraffin oil, I have obtained the best results by the employment of these materials in the proportions of about 1 part by weight of phenylenediamin to 2 parts by weight of paraffin oil. Where acetic acid is used, I employ about 2 parts by weight of such acid. If mineral rubber is employed, I preferably use the same amount of this material as of paraffin oil and if rubber resin is employed, I use the same amount of this material as of phenylenediamin.

I preferably use from 1 to 5 gallons of the solvent mixture referred to, to 100 pounds of the treated rubber waste, the proportions depending upon the nature of the waste under treatment. The mass is thoroughly agitated in the hermetically sealed container, preferably from 6 to 12 hours under steam pressure of from 50 to 200 pounds per square inch.

The result of the treatment last referred to, is that the greater part of the sulfur contained in the vulcanized rubber is dissolved out by the solvent while the unvulcanized rubber remains practically unacted upon.

In the case of rubber waste containing no fiber or fabric, the initial treatment with caustic soda may be omitted, the shredded or ground waste being subjected to the action of a solution containing phenylenediamin and paraffin oil, preferably having added thereto mineral rubber or rubber resin or both. I have obtained the most satisfactory results in the treatment of the shredded or ground rubber waste containing no fiber or fabric by the use of a solvent mixture containing 1 part by weight of phenylenediamin, 2 parts by weight of paraffin oil, 2 parts by weight of mineral rubber, and 1 part by weight of rubber resin.

The disintegrated rubber waste is subjected to the action of the solvent mixture in a closed vessel for preferably from 5 to 20 hours at a pressure of from 50 to 200 pounds per square inch.

The most satisfactory results from the standpoint of simplicity, ease of operation, economy, etc., have been obtained by the employment of from 10 to 15 pounds of the solvent mixture to 100 pounds of ground rubber waste.

While in the practice of my process, I prefer to employ a mixture of phenylenediamin and paraffin oil and have obtained the best results by the use of this mixture and mineral rubber or rubber resin or both, some measure of success may be obtained by the use of phenylenediamin alone and when such material is employed, I follow the procedure described in connection with the use of the preferred solvent mixture.

After the treatment of the rubber by the action of the phenylenediamin solvent mixture, as described, the devulcanized rubber is thoroughly washed and dried.

I have found that rubber waste reclaimed by the employment of this process does not oxidize as readily as that reclained by the methods usually employed and that sheets of the resulting rubber do not become dried nor bloom out when worked up into finished goods. By my process, the rubber reclaimed is restored substantially to its original condition and is adapted for use for most purposes for which new rubber gum is employed.

It will be understood by those skilled in the art that the degree of pressure, duration of treatment, proportions of ingredients, and details of procedure are not essential features of my invention and are determined largely from considerations of economy and ease of operation of the process. It will also be understood that such pressure, duration of treatment and proportion of ingredients, etc., may be widely varied and that known chemical equivalents of the materials employed may be resorted to, all without departure from the spirit of the invention or the scope of the subjoined claims.

Having thus described my invention, I claim:

1. The herein described process of treating rubber waste comprising subjecting it to the action of a solvent comprising phenylenediamin and mineral rubber.

2. The herein described process of treating rubber waste comprising subjecting it to the action of a solvent comprising phenylenediamin and paraffin oil.

3. The herein described process of treating rubber waste comprising subjecting it to the action of a solvent comprising phenylenediamin, paraffin oil, and mineral rubber.

4. The herein described process of treating rubber waste comprising subjecting it to the action of a solvent comprising phenylenediamin, paraffin oil, mineral rubber, and rubber resin.

5. The herein described process of treating rubber waste comprising subjecting it to the action of a solvent comprising phenylenediamin, paraffin oil, mineral rubber, rubber resin and an acid.

6. The herein described process of treating rubber waste comprising subjecting it to the action of a solvent comprising phenylenediamin, paraffin oil, mineral rubber, rubber resin and acetic acid.

7. The herein described process of treating rubber waste comprising subjecting it to the action of a heated solvent comprising phenylenediamin and rubber resin.

8. The herein described process of treating rubber waste comprising subjecting it to the action of a heated solvent comprising phenylenediamin and paraffin oil.

9. The herein described process of treating rubber waste comprising subjecting it to the action of a heated solvent comprising phenylenediamin, paraffin oil and mineral rubber.

10. The herein described process of treating rubber waste comprising subjecting it to the action of a heated solvent comprising phenylenediamin, paraffin oil, mineral rubber, and rubber resin.

11. The herein described process of treating rubber waste comprising subjecting it to the action of a heated solvent comprising phenylenediamin, paraffin oil, mineral rubber, rubber resin and an acid.

12. The herein described process of treating rubber waste comprising subjecting it to the action of a heated solvent comprising phenylenediamin, paraffin oil, mineral rubber, rubber resin, and acetic acid.

13. The herein described process of treating rubber waste comprising subjecting it to the action of a heated solvent comprising phenylenediamin and an acid, under superatmospheric pressure.

14. The herein described process of treating rubber waste comprising subjecting it to the action of a heated solvent comprising phenylenediamin and paraffin oil, under superatmospheric pressure.

15. The herein described process of treating rubber waste comprising subjecting it to the action of a heated solvent comprising phenylenediamin, paraffin oil and mineral rubber, under superatmospheric pressure.

16. The herein described process of treating rubber waste comprising subjecting it to the action of a heated solvent comprising phenylenediamin, paraffin oil, mineral rubber, and rubber resin, under superatmospheric pressure.

17. The herein described process of treating rubber waste comprising subjecting it to the action of a heated solvent comprising phenylenediamin, paraffin oil, mineral rubber, rubber resin and an acid, under superatmospheric pressure.

18. The herein described process of treating rubber waste comprising subjecting it to the action of a heated solvent comprising phenylenediamin, paraffin oil, mineral rubber, rubber resin, and acetic acid, under superatmospheric pressure.

19. The herein described process of treating rubber waste comprising subjecting it to the action of a fabric dissolving alkali at an elevated temperature and under superatmospheric pressure and then to the action of a solvent comprising phenylenediamin.

20. The herein described process of treating rubber waste comprising subjecting it to the action of a fabric dissolving alkali at an elevated temperature and under superatmospheric pressure, and then to the action of a solvent comprising phenylenediamin and paraffin oil.

21. The herein described process of treating rubber waste comprising subjecting it to the action of a fabric dissolving alkali at an elevated temperature and under superatmospheric pressure, and then to the action of a solvent comprising phenylenediamin, paraffin oil, and mineral rubber.

22. The herein described process of treating rubber waste comprising subjecting it to the action of a fabric dissolving alkali at an elevated temperature and under superatmospheric pressure, and then to the action of a solvent comprising phenylenediamin, paraffin oil, mineral rubber, and rubber resin.

23. The herein described process of treating rubber waste comprising subjecting it to the action of a fabric dissolving alkali at an elevated temperature and under superatmospheric pressure, and then to the action of a solvent comprising phenylenediamin, paraffin oil, mineral rubber, rubber resin, and an acid.

24. The herein described process of treating rubber waste comprising subjecting it to the action of a fabric dissolving alkali at an elevated temperature and under superatmospheric pressure, and then to the action of a solvent comprising phenylenediamin, paraffin oil, mineral rubber, rubber resin, and acetic acid.

25. The herein described process of treating rubber waste comprising disintegrating it, subjecting the disintegrated mass to the action of a heated liquid bath containing approximately from 10 to 15 per cent. by weight of caustic soda in aqueous solution for approximately from 6 to 20 hours at a pressure of from 50 to 200 pounds per square inch, then subjecting the treated waste to the action of a solvent comprising approximately 1 part by weight of phenylenediamin, 2 parts by weight of paraffin oil, 2 parts by weight of mineral rubber, 1 part by weight of rubber resin, and 2 parts by weight of acetic acid and washing and drying the resulting mass.

In testimony whereof I affix my signature.

FRANK L. KRYDER.